US007624692B2

(12) United States Patent
Dryden

(10) Patent No.: US 7,624,692 B2
(45) Date of Patent: Dec. 1, 2009

(54) SAND DISPENSER FOR A SCARIFIER

(76) Inventor: Graham Dryden, 26-28 Scammel Street, Campbellfield VIC 3061 (AU)

( * ) Notice: Subject to any disclaimer, the term of this patent is extended or adjusted under 35 U.S.C. 154(b) by 0 days.

(21) Appl. No.: 11/795,317

(22) PCT Filed: Jan. 18, 2006

(86) PCT No.: PCT/AU2006/000058

§ 371 (c)(1),
(2), (4) Date: Jul. 16, 2007

(87) PCT Pub. No.: WO2006/076768

PCT Pub. Date: Jul. 27, 2006

(65) Prior Publication Data

US 2008/0229987 A1    Sep. 25, 2008

(30) Foreign Application Priority Data

Jan. 18, 2005    (AU) .............................. 2005900213

(51) Int. Cl.
*A01C 7/00*  (2006.01)
*A01C 7/08*  (2006.01)
*A01C 9/00*  (2006.01)
*A01C 15/00* (2006.01)

(52) U.S. Cl. ...................... 111/133; 111/170; 111/200; 111/900

(58) Field of Classification Search ......... 111/130–133, 111/11–13, 170, 177, 178, 200, 906, 915, 111/900
See application file for complete search history.

(56) References Cited

U.S. PATENT DOCUMENTS

| 5,172,645 | A  | 12/1992 | Billett et al. |
| 6,928,940 | B2 | 8/2005  | Soun |
| 2004/0216655 | A1 | 11/2004 | Soun |

FOREIGN PATENT DOCUMENTS

| AU | 86902/82 B       | 3/1983 |
| AU | 32996/84 A       | 3/1985 |
| EP | 1 440 616 A1     | 7/2004 |
| SU | 1031416 A        | 7/1983 |
| WO | WO 2005/029940 A1 | 4/2005 |

OTHER PUBLICATIONS

Australian International Search Report for PCT/AU2006/000058, filed Jan. 18, 2006, (Form PCT/ISA/210 first sheet; continuation of first sheet; second sheet continuation second sheet; and patent family annex).

*Primary Examiner*—Christopher J. Novosad
(74) *Attorney, Agent, or Firm*—Fitch, Even, Tabin & Flannery; Kendrew H. Colton

(57) ABSTRACT

A sand dispenser for a scarifier wherein the sand dispenser is mounted on the scarifier and comprises: a sand hopper having an outlet at a lower end of the hopper; a gate located below the outlet and moveable between an open position and a closed position for controlling the flow of sand through the hopper and into a distributor, the distributor including a row of distributing lines through which sand is directed to flow and enter grooves in the ground created by blades of the scarifier, wherein each distributing line is aligned with a groove.

19 Claims, 9 Drawing Sheets

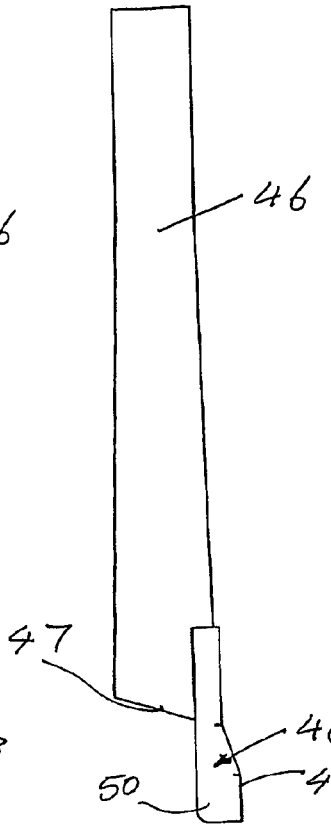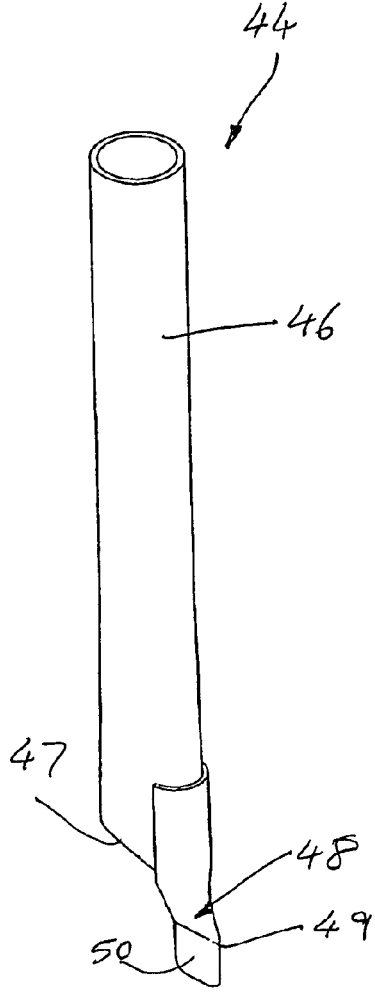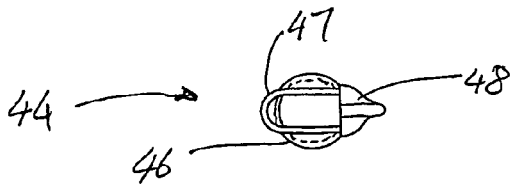
FIGURE 5(b)
FIGURE 5(c)
FIGURE 5(d)
FIGURE 5(a)

SAND DISPENSER FOR A SCARIFIER

This Application is the U.S. National Stage Application under 35 U.S.C. 371 of International Application PCT/AU2006/000058 filed Jan. 18, 2006, and claims the foreign filing benefit from Australian patent application number 2005900213 filed Jan. 18, 2005, the complete disclosures of which are incorporated herein by reference.

The present invention relates to a sand dispenser for a scarifier. Moreover, the sand dispenser can be used for a tractor mounted scarifier and for a pedestrian scarifier, examples of which are disclosed in applicant's co-pending international application publication no. WO 2005/029940, which is incorporated herein by reference.

The use of scarifiers in maintaining healthy turf surfaces by aerificating and dethatching turf is important. Scarifiers physically remove organic matter in the form of old roots and other plant matter that accumulates in the upper portion of the soil profile. By using a blade to cut a path into the surface profile the organic matter is brought to the surface and removed. The ground cuts are then usually topped dressed with sand and/or seed mixture.

Topdressing is a significant part of turf maintenance. Topdressing replaces the thatch layer removed by the scarifier with sand, which allows water and nutrients to access the root zone of the grass. This quickens grass germination and healing, and in general is an important agronomic practice.

Topdressing is carried out by dropping sand onto the cut grooves and manually working the sand into the grooves. Sand spreading machines are provided with sand hoppers that drop sand onto the grooves created by the rotor blades of scarifiers. The sand is then manually worked into the grooves. The problem with such machines is that it is difficult to direct sand into the grooves. Additionally, the wheels of these machines tend to drive over and close the grooves, which is undesirable.

The present invention addresses the above problems by improving the control and distribution of sand dispensed onto scarified ground.

SUMMARY OF THE INVENTION

In accordance with one aspect of the present invention there is provided a sand dispenser for a scarifier wherein the sand dispenser is mounted on the scarifier and comprises:

a sand hopper having an outlet at a lower end of the hopper;

a gate located below the outlet and moveable between an open position and a closed position for controlling the flow of sand through the hopper and into a distributor, the distributor including a row of distributing lines through which sand is directed to flow and enter grooves in the ground created by blades of the scarifier, wherein each distributing line is aligned with a groove.

Movement of the gate is preferably linked to the raising and lowering movement of a rotor assembly which houses the blades of the scarifier. Specifically, lowering of the rotor assembly to engage the blades with the ground opens the gate, whereas raising the rotor assembly closes the gate.

Preferably the gate is a metering cylinder having a row of apertures which when aligned with the hopper outlet permits sand to flow therethrough. The open and closed positions of the metering cylinder are preferably achieved by rotating the cylinder. A lateral side of the metering cylinder is preferably provided with a lever to which is attached a biasing means that connects the lever directly or indirectly to the rotor assembly and thereby linking the rotor assembly and metering cylinder wherein lowering or raising of the rotor assembly causes the metering cylinder to rotate between the open and closed positions.

The ends of the distributing lines preferably each include a tube and a guide at the end of the tube that is adapted, in use, to protrude into the groove. The guide is preferably rigid and has a forward face that, in use, pushes debris and organic matter out of the groove before sand is dispensed therein. The tube tapers from a circular cross section at an upper part to an elliptical cross section at the end of the tube. Preferably the end of the tube is cut at an angle to facilitate free flow of sand into the groove.

The distributor preferably includes a distributor tray into which sand flowing through the gates collects and wherein the distributing lines are attached to the distributor tray.

A seal is preferably provided between the hopper outlet and the metering cylinder. The seal is preferably a strip of sealing material that is attached to the underside of the hopper and has a row of holes.

In a further aspect of the present invention there is provided a scarifier containing a main frame supported on wheels, a rotor assembly supporting blades wherein the rotor assembly is moveable between a raised position and a lowered position, driving means to drive rotation of the blades, and sand dispenser as described above.

In yet a further aspect of the present invention there is provided a method of dispensing sand from a sand dispenser mounted on a scarifier including:

introducing sand into a sand hopper of the sand dispenser;

opening a gate below the hopper to allow sand to flow through a hopper outlet, through the gate and into a distributor;

directing sand through a row of distributing lines of the distributor and into grooves in the ground created by blades of the scarifier, whereby each distributing line is aligned with a groove.

The opening of the gate is preferably synchronised with the movement of lowering a rotor assembly of the scarifier, wherein the rotor assembly houses the blades.

BRIEF DESCRIPTION OF THE DRAWINGS

An embodiment, incorporating all aspects of the invention, will now be described by way of example only with reference to the accompanying drawings in which:

FIG. 5(a) is an isometric view of a distribution line of the sand dispenser illustrated in FIGS. 3 and 4;

FIG. 5(b) is a rear view of the distribution line of FIG. 5(a);

FIG. 5(c) is a side view of the distribution line of FIG. 5(a);

FIG. 5(d) is an under view of the distribution line illustrated in FIG. 5(a);

PREFERRED EMBODIMENT OF THE INVENTION

Figure 1:
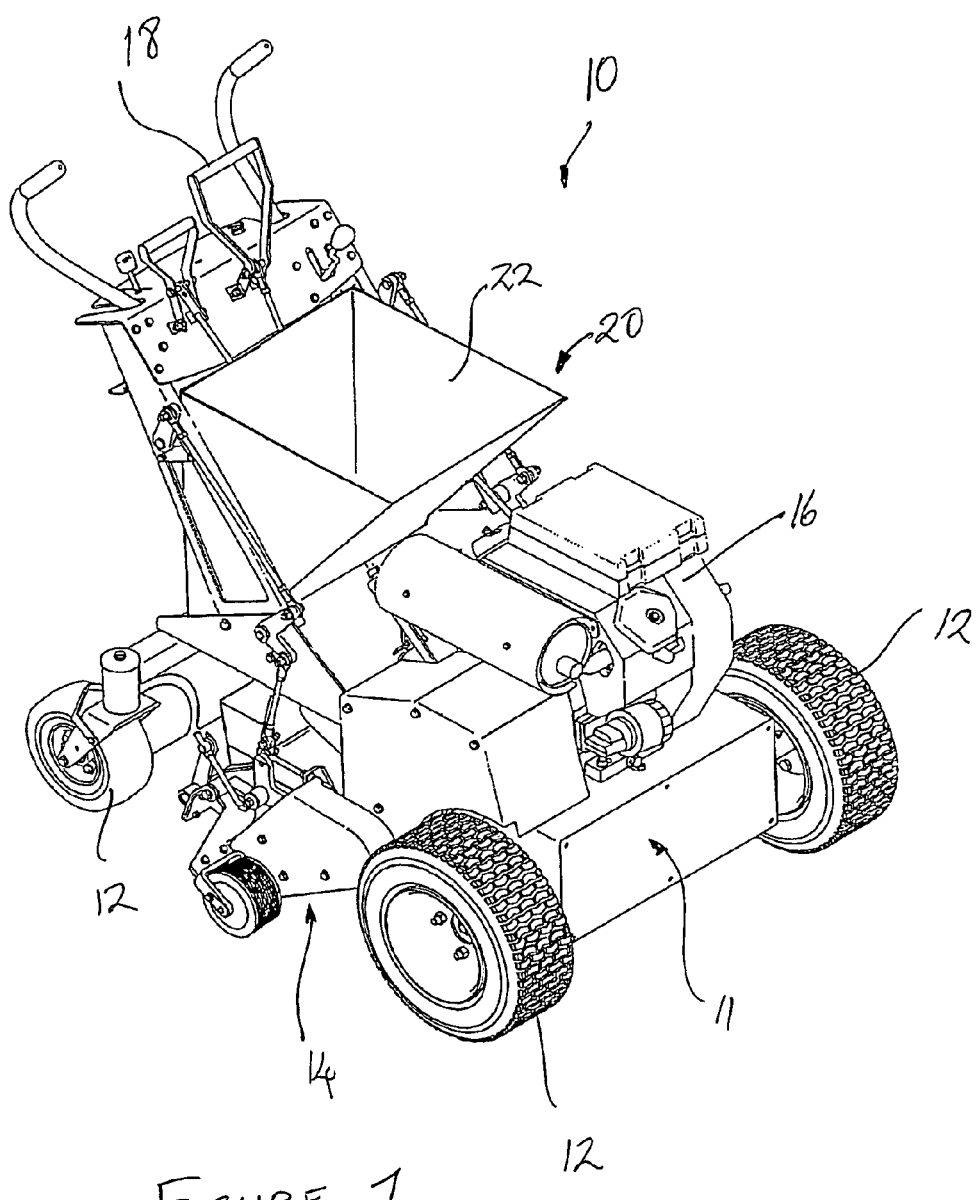
FIG. 1 is a front isometric view of a pedestrian scarifier.
Figure 2:
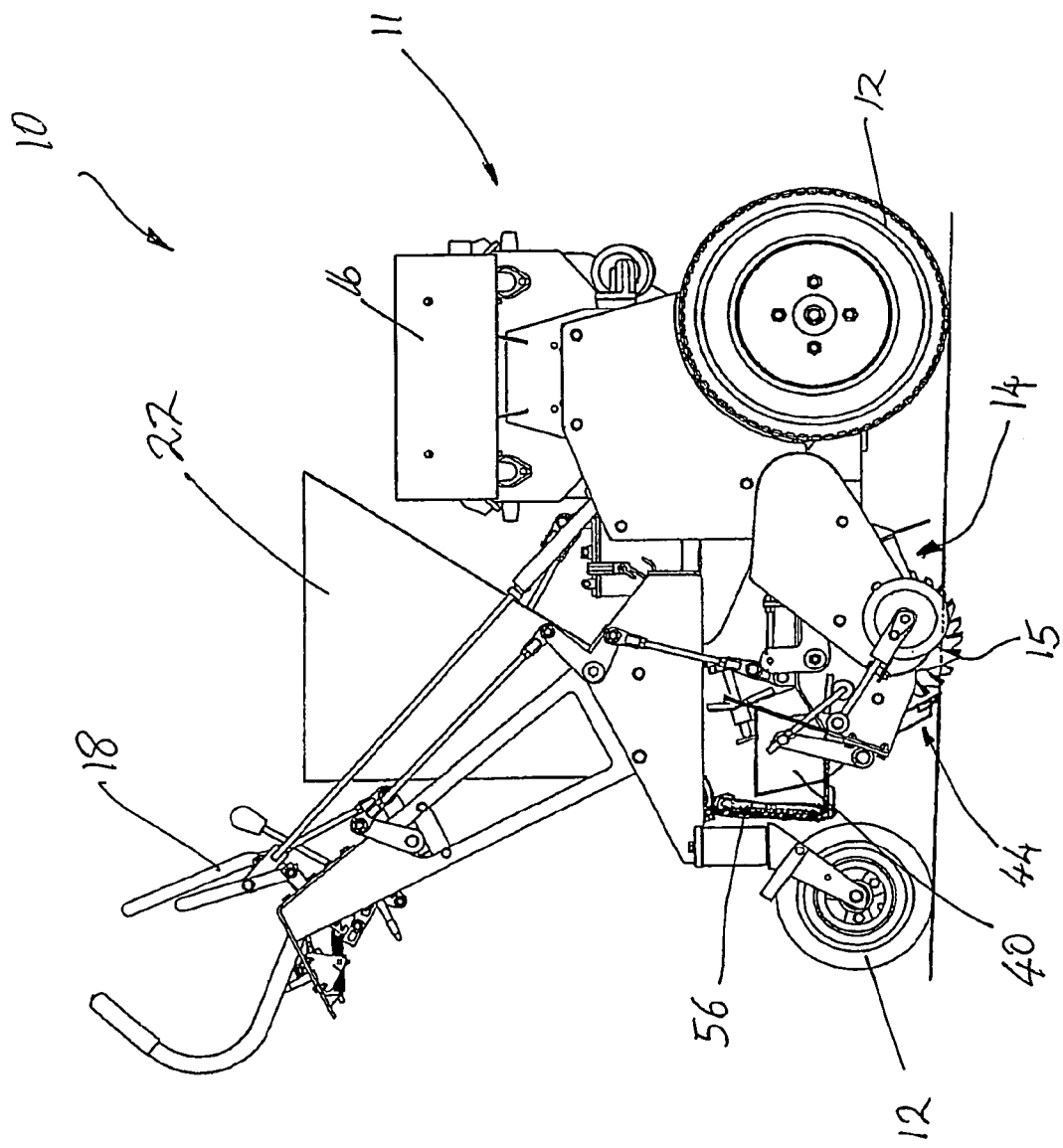
FIG. 2 is a side elevation view of the pedestrian scarifier of FIG. 1.

FIGS. 1 and 2 illustrates a pedestrian scarifier 10 having a scarifier structure 11 supported on four wheels 12 and a rotor assembly 14 supported by a rotor housing 13 that is height adjustable relative to the scarifier structure 11 for raising and lowering cutting blades 15 of the rotor assembly 14. Blades 15 are aligned in a row spaced on a rotor shaft (not shown) that is driven by an engine 16.

FIG. 2 illustrates rotor assembly 14 in a lowered operating position where blades 15 engage and cut grooves into the ground. Hand lever 18 is pivoted by a user to raise rotor assembly 14 off the ground into an inoperative position (not shown).

A sand dispenser 20 is mounted onto the scarifier 10 and in use dispenses a controlled flow of sand behind blades 15 and into the grooves newly formed by the blades. The sand dispenser 20 dispenses an appropriate amount of sand for the depth of grooves created and drops the sand directly into the groove.

Figure 3:
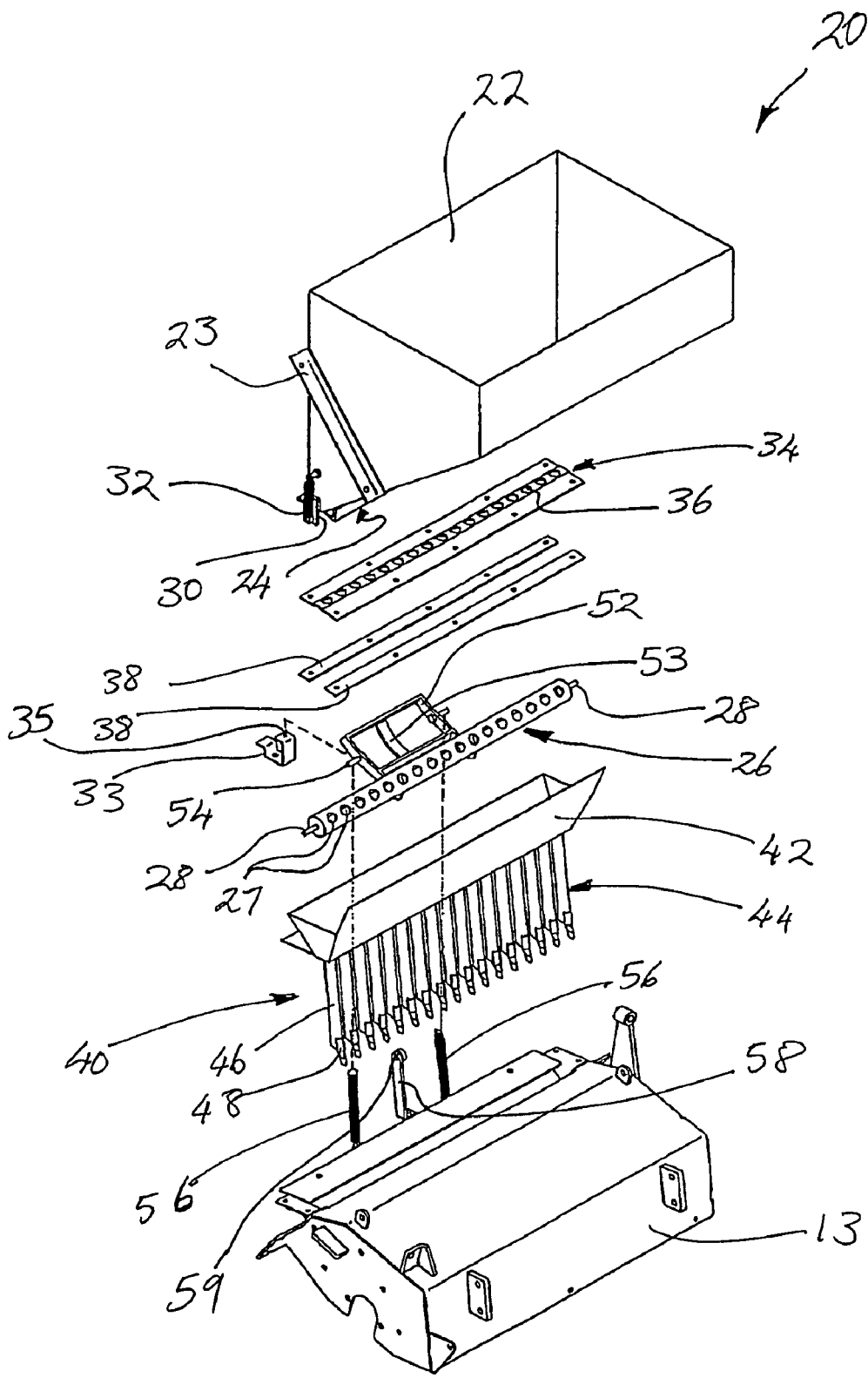
FIG. 3 is an exploded front isometric view of a sand dispenser in accordance with a first embodiment of the invention.
Figure 4:
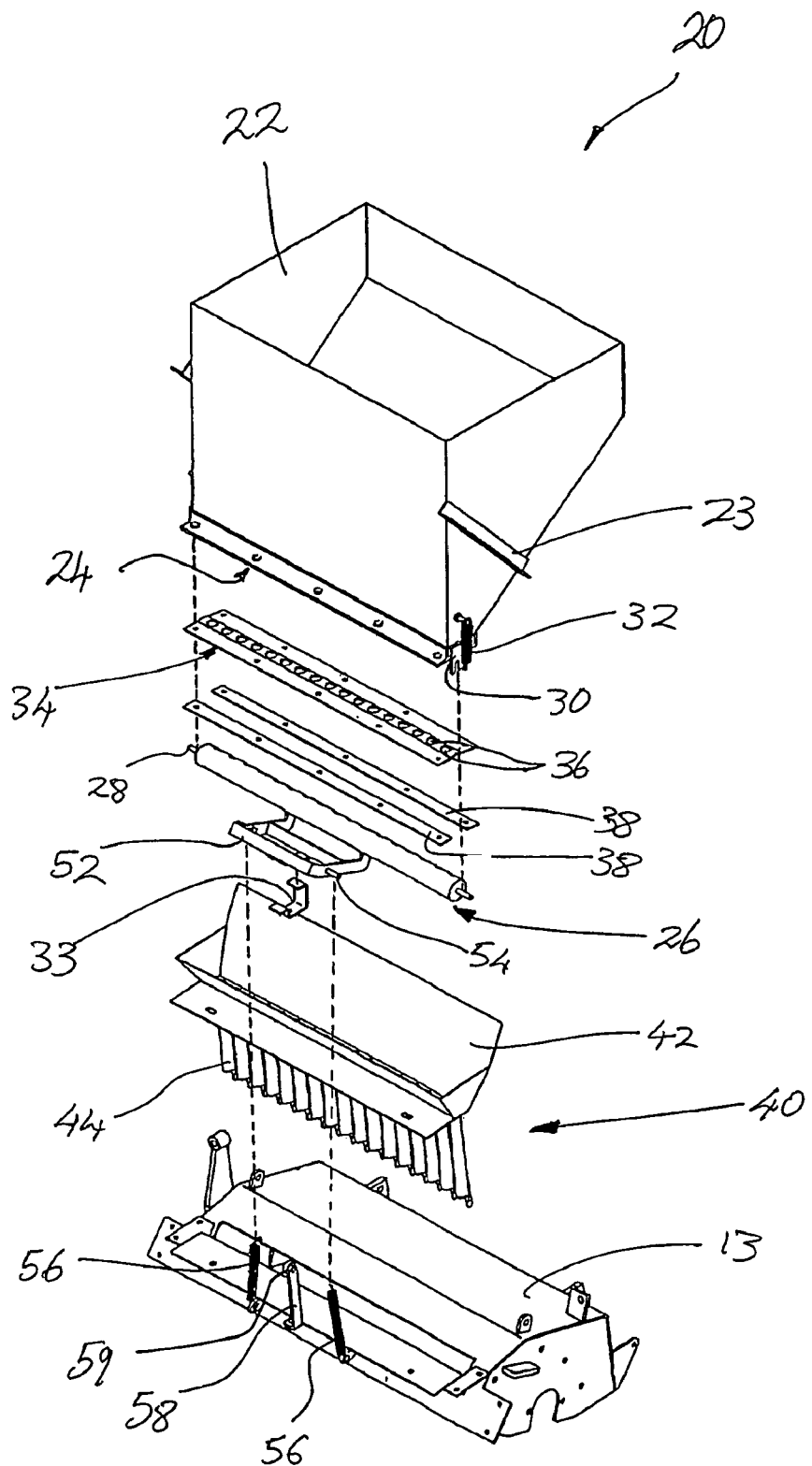
FIG. 4 is an exploded rear isometric view of the sand dispenser of FIG. 3.

FIGS. 3 and 4 illustrates exploded views of the components of one embodiment of the sand dispenser 20 of the scarifier illustrated in FIGS. 1 and 2. A sand hopper 22 is mounted to the scarifier structure 11 and is adapted to supply a quantity of sand. Mounting bracket 23 welded to the side of the hopper is used to mount the hopper to the scarifier structure 11. The hopper may vary in size and shape depending on design constraints and limitations on space. In the embodiment shown the hopper can be filled with approximately up to 100 kg of sand, but preferably 50-75 kg. The hopper directs sand to dispense out through a hopper outlet 24 at the lower end of the hopper 22. Sand outlet 24 is an elongate opening spanning the length of the lower end of the hopper.

A gate in the form of a metering cylinder 26 controls the flow of sand from the hopper by moving between an open position and a closed position. The metering cylinder is a solid narrow cylindrical member that spans the length of the hopper outlet and contains a row of apertures 27 extending transversally through the cylinder. Metering cylinder 26 is adapted to rotate on end pins 28 so as to act as a gate in opening and closing the flow of sand through the hopper by aligning and misaligning apertures 27 with hopper outlet 24.

Accordingly, when apertures 27 are aligned with hopper outlet 24 sand can freely flow through the outlet and through the apertures 27 in the metering cylinder 26. To close the flow of sand metering cylinder is rotated approximately 90° thereby closing off the flow path of sand through the dispenser.

End pins 28 of metering cylinder 26 are supported in slotted tabs 30 welded to the lower end of the hopper 22 at each end of hopper outlet 24. End pins 28 locate through slots of tabs 30 and are restrained by a hopper spring 32 to bias towards hopper outlet 24.

To prevent unintentional escape of sand from the hopper outlet a seal 34 made of a polymer such as rubber or the like, is placed across the hopper outlet 24 on the underside of the hopper 22. The seal is provided with a row of holes 36 spanning across the outlet opening and through which sand can flow. Clamping strips 38 are used to clamp and fix seal 34 across the sand outlet. The clamping strips 38 fix seal 34 to the outlet by way of fastening screws (not shown). Seal holes 36 of seal 34 are spaced to align with apertures 27 in metering cylinder 26. Accordingly, when the metering cylinder is in the open position, sand is permitted to flow from the hopper through seal holes 36 and through metering apertures 27.

From the metering cylinder 26 the sand dispenses into a distributor 40 which comprises a distributor tray 42 and distributor lines 44. Distributor tray 42 is mounted to the rotor housing 13 and therefore raises and lowers with the rotor housing. The distributor tray is an elongate trough-like member into which sand is dispensed. The walls of the distributor tray contain the metered sand within the confines of the distributor tray. At its base the distributor tray contains a number of apertures (not shown) where each aperture is sealingly connected by welding to a distributing line 44.

As illustrated in FIG. 2 the distributing lines 44 are located behind the cutting blades 15 on the scarifier and are angled to sweep forward through the cut grooves as the scarifier is moved forward. In the embodiment shown there are 17 distributor lines 44, one located behind each blade. In practice as little as 5 distributor lines would make the sand dispensing exercise worthwhile, while the maximum number would depend on the maximum number of blades, which could practically be 20, or more for longer scarifying.

The distributor lines include a tube 46 and a guide 48 mounted at the bottom end 47 of the tube 46. FIGS. 5(a) to 5(d) illustrate a distributor line. The distributor lines are aligned such that each line is positioned directly behind a blade 15. This ensures that as a groove is cut by a blade a distributing line dispenses sand directly into the groove. The guides themselves protrude into the groove while the bottom end of the tube 46 sits just above the groove to dispense sand therein. The bottom end 47 of tube 46 is cut at an angle to facilitate smooth dispensing of the sand into the groove. Tubes 46 and guides 48 are made of a rigid material and specifically of steel.

The guide 48 is welded at the front lower end of the tube 46 and has a forward face 49 that tapers into a fin 50 at its lowest point. The guide is shaped and positioned on the tube 46 to sweep through the groove directed behind the blade and clear the groove of any debris or organic matter that may be obstructing the groove. Sand exiting tube 46 is then able to freely flow into the groove without encountering any obstructions. Debris and organic matter pushed out of the groove by the guide can be collected and removed after the scarifier has passed over the turf.

The sand dispenser 20 is connected through a lever arrangement to open and close in synchronisation with the lowering and raising of the rotor assembly 14. More specifically, as shown in FIGS. 3 and 4 the metering cylinder is connected by way of a lever 52 to respond to raising and lowering of the rotor housing 13 supporting the rotor assembly 14.

Lever 52 is a rectangular frame that is fixed to extend laterally of metering cylinder 26. Lever pins 54 on lever 52 are spaced from metering cylinder 26 to provide a leverage distance. Metering springs 56 are fixed between lever pins 54 and the rear of rotor housing 13. Metering springs 56 function to pull down on lever arm 52 as the rotor assembly 14 is lowered by hand lever 18. In other words, as a user pivots hand lever 18 to lower the rotor assembly 14 to the ground, and hence the cutting blades 15, metering springs 56 by their attachment to the rotor housing 13 impart a downward force on lever arm 52 which in turn causes the metering cylinder to rotate into an open position where the cylinder apertures 27 are aligned with the outlet of the hopper and the sand flow path becomes open. With the flow path open sand is free to flow from the hopper through the metering cylinder into the distributor tray and down through the distributor lines.

On completing the task of scarifying the user will pivot hand lever 18 to raise the rotor assembly 14 off the ground. A rigid return arm 58 with a roller bearing 59 on its end is mounted between the rear of the rotor housing 13 and the lever arm 52. Upward motion of the rotor housing causes return arm 58 to impart an upward force on lever arm 52 which in turn rotates metering cylinder 26 back into a closed position where the metering apertures 27 move back out of alignment with the hopper outlet 24. To ensure the return movement is smooth, the roller bearing 59 contacts and slides on the underside of a curved strip 53 on the lever arm 52.

The degree of rotation of the metering cylinder and the amount of sand permitted to flow through the cylinder is controlled by a metering gauge 33. The metering gauge 33 is attached to the scarifier structure 11 and is manually adjusted before scarifying to control the degree of rotation of the lever arm 52 by acting as a stop below the lever arm and prevent any further rotation of the metering cylinder 26. Metering gauge 33 is bolted to the housing structure in a manner which allows it to be rotated to provide various stop levels. The metering gauge 33 is shaped similar to a rectangular hook and in the drawings shown in FIGS. 3 and 4 the metering gauge 33 is positioned in an orientation which will allow only minimal rotation of the metering cylinder 26.

Specifically, on rotation of metering cylinder 26 lever arm 52 will abut against the top 35 of the metering gauge 33 and prevent any further rotation of the metering cylinder. If a greater sand flow is required the metering gauge 33 can be manually rotated to allow further rotation of the metering cylinder and therefore an increased sand flow owing to the metering apertures 27 being more opened to the hopper outlet 24. Various degrees of sand flow can be achieved depending on the shape of the metering gauge and the orientation in which it is rotated. In the present embodiment there are three open settings: small sand flow, medium flow and full flow.

The flow rate of sand metered through the sand dispenser 20 can also be automatically increased or decreased depending on the depth of a groove to be cut. This could be achieved by ensuring rotation of the metering cylinder is scaled to directly relate to the distance by which the rotor assembly is lowered.

For example, where only shallow grooves are required to be cut by the scarifier the rotor housing can be set such that the blades extend only partly into the ground. Since the rotor assembly only partly lowers to the ground, metering cylinder will also only rotate part way such that metering apertures 27 only partly align with hopper outlet 24. Because the flow area of the partly aligned apertures is less than the flow area of fully aligned apertures the flow rate of sand flowing through the dispenser will be reduced.

However, in the present embodiment the metering gauge 33 largely controls the flow rate of sand through the metering cylinder depending on which flow setting it is set to before dispensing.

Figure 6:
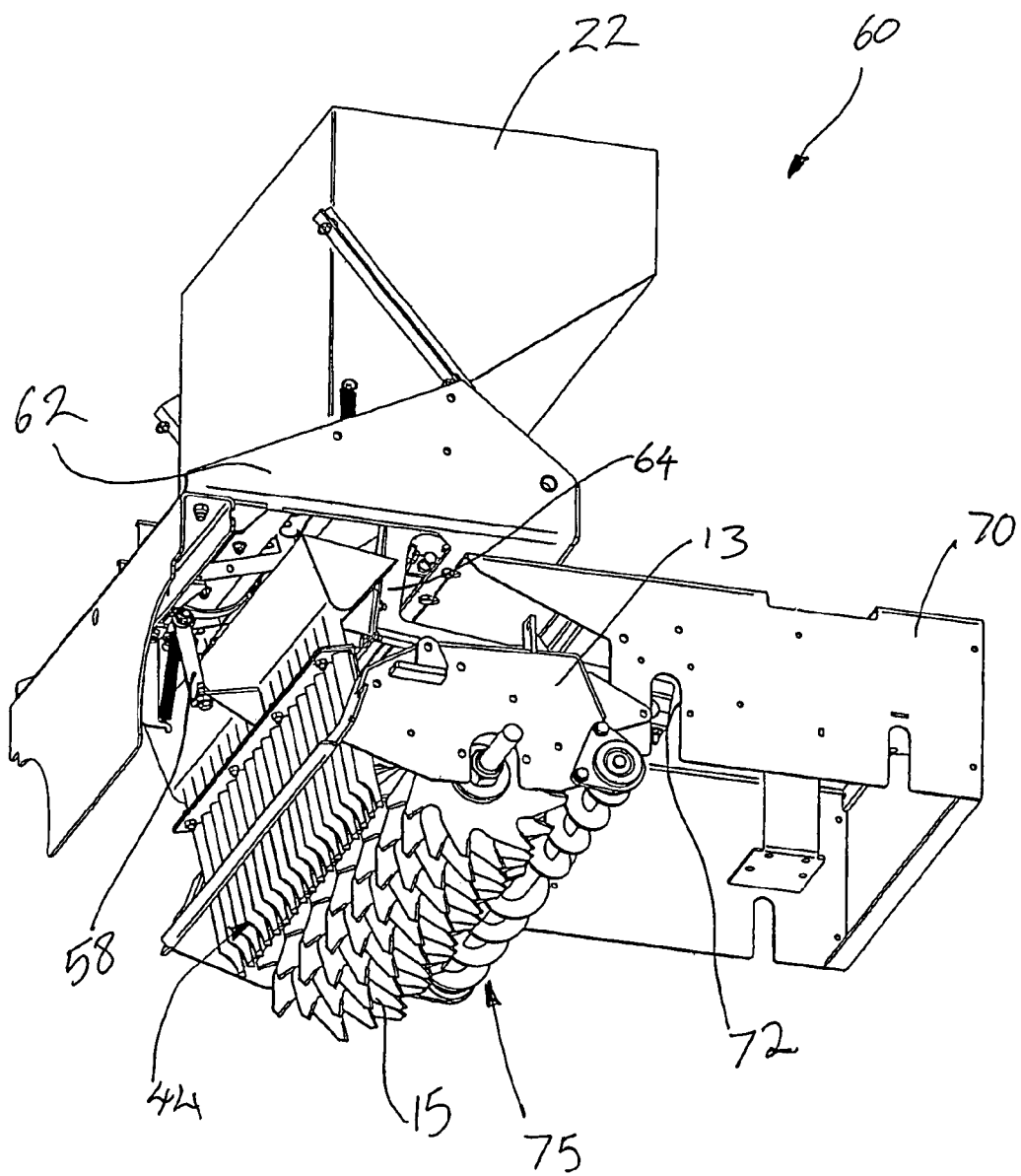
FIG. 6 is a lower rear perspective view of a sand dispenser in accordance with a second embodiment of the invention.
Figure 7:
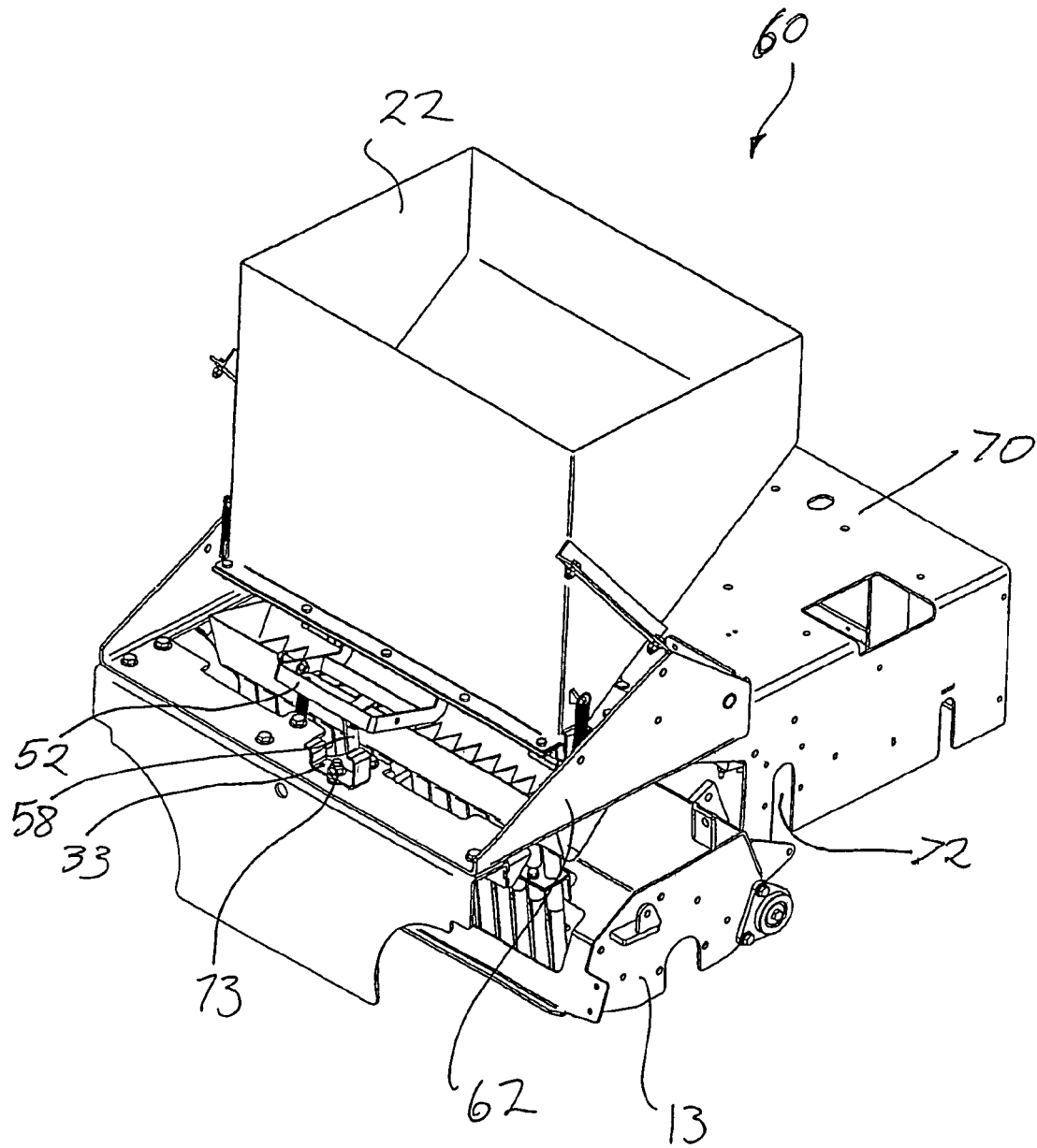
FIG. 7 is an upper rear perspective view of the sand dispenser of FIG. 6.
Figure 8:
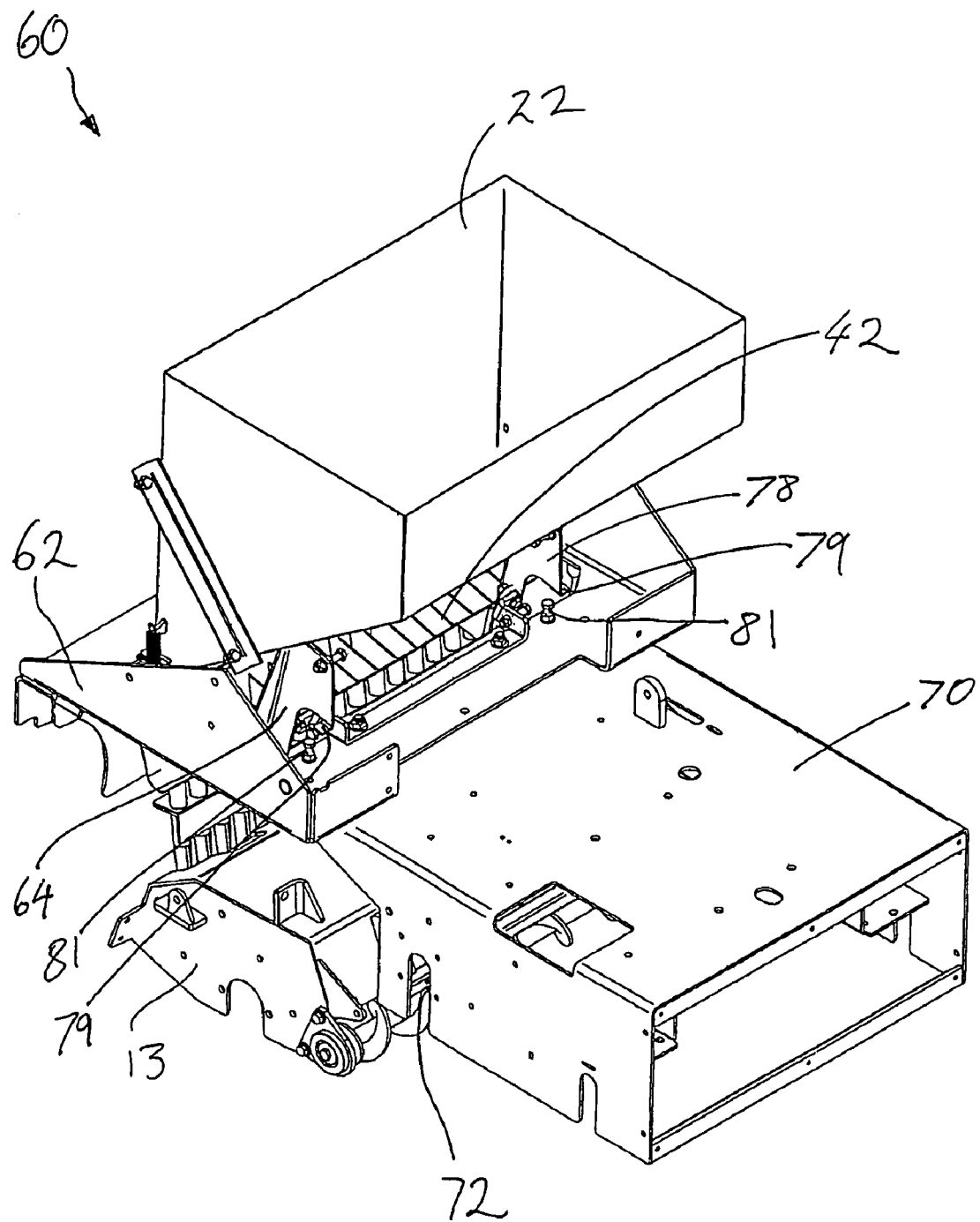
FIG. 8 is a upper front perspective view of the sand dispenser of FIG. 6.
Figure 9:
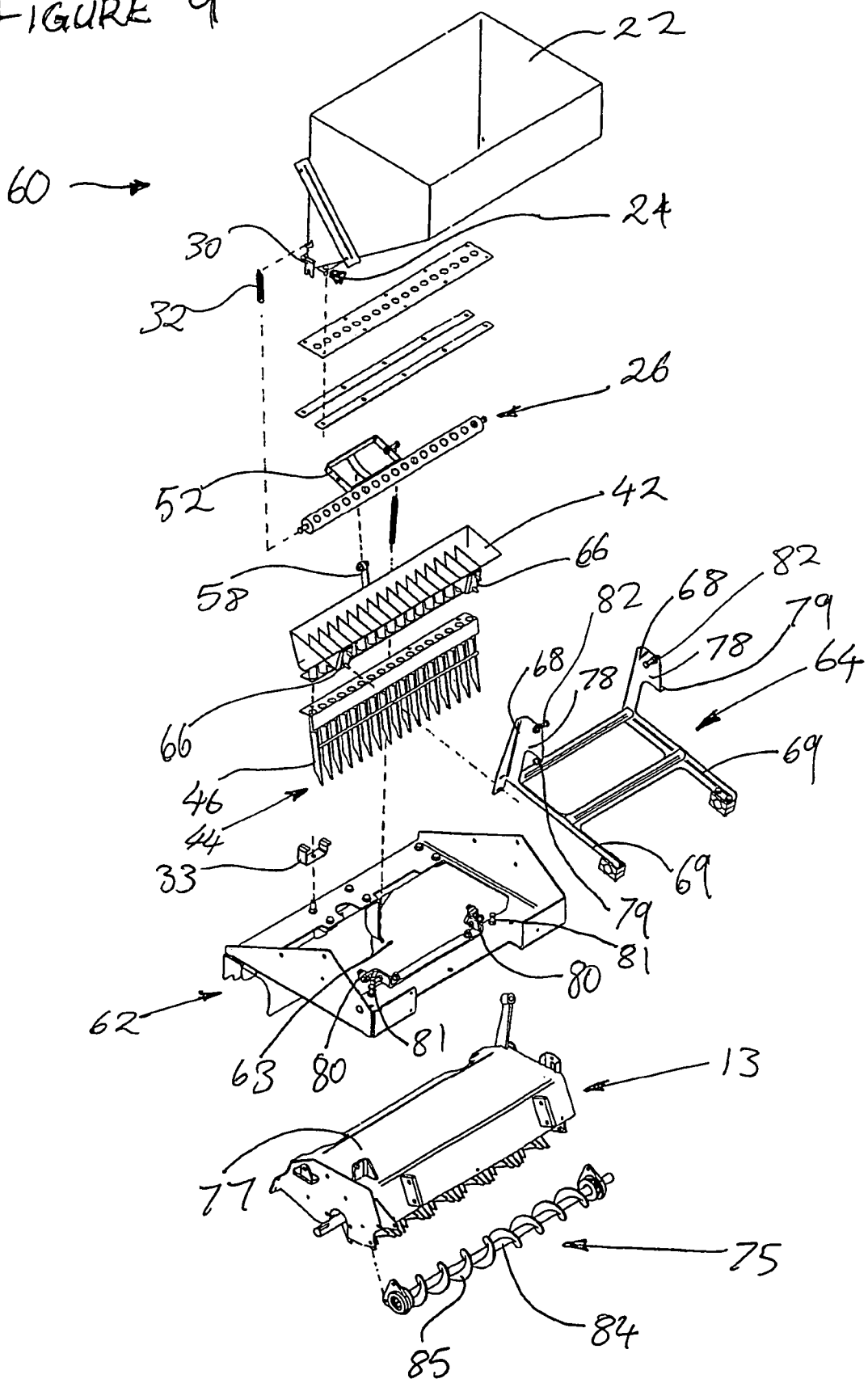
FIG. 9 is an exploded front isometric view of the sand dispenser of FIG. 6.

FIGS. 6 to 9 represent the second embodiment of the sand dispenser 60. All parts in the second embodiment that are similar to those in the first embodiment are represented by the same reference numerals. FIGS. 6 and 9 illustrate the sand dispenser 60 with cutting blades 15 while FIGS. 7 and 8 illustrate sand dispenser 60 without cutting blades 15.

In the second embodiment, sand dispenser 60 contains several new components to more stably support and actuate the dispensing components and to permit the dispenser to operate more accurately and efficiently.

In the first embodiment of the sand dispenser 20 illustrated in FIGS. 3 and 4, rotation of metering cylinder 26 to open and close the lower end of the sand hopper 22 is directly caused by the raising and lowering of rotor housing 13 by way of metering springs 56 and return arm 58. In the second embodiment illustrated in FIGS. 6 to 9 rotation of metering cylinder 26 is also caused by raising and lowering of rotor housing 13 but by indirect means and specifically by way of a distributor tray bracket 64.

The additional components to the second embodiment also include a carriage 62. The carriage 62 is bolted onto engine base 70 and supports hopper 22 and the metering gauge 33. Metering cylinder 26 in this embodiment is still located in slots of tab 30 at hopper outlet 24. Lever 52 on metering cylinder 26 restricts rotation of the metering cylinder by stopping against metering gauge 33, which in this embodiment is located on a surface of carriage 62 and re-orientated with respect to the first embodiment of the sand dispenser 20.

Metering gauge 33, as in the first embodiment, can be pivoted in the second embodiment to change the effective height of the gauge 33 in its role as a stop, and therefore change the degree of rotation allowable by the metering cylinder and hence the amount of sand flowing through the cylinder. Metering gauge 33 is held on carriage bracket by nut 73.

Distributor tray bracket 64 is attached to distributor tray 42 by receiving lugs 66 on the distributor tray 42. Lugs 66 are received at a lower end of distributor tray bracket 64. Distributor tray bracket 64 contains upward arms 68 and perpendicular arms 69. The ends of perpendicular arms 69 are pivotally mounted to the scarifier, or more specifically, to the engine base 70, on the same shaft on which the rotor housing 13 is mounted to the engine base 70.

While the shaft is not shown, opening 72 indicates where the shaft to which both the rotor housing 13 and the distributor tray bracket 64 is to be mounted. Through this connection the distributor tray 42 pivots in synchronisation with rotor housing 13. Therefore, raising and lowering of rotor housing 13 raises and lowers distributor tray bracket 64. This is possible because perpendicular arms 69 of tray bracket 64 sit on the top 77 of rotor housing 13. As rotor housing 13 is lowered about the shaft (not shown), distributor tray bracket 64 also lowers about the shaft.

Upward arms 68 are located to protrude upwards through a large central opening 63 in carriage 62 where an underside of flanges 78 on upward arms 68 locate on small roller bearings 80 positioned on carriage 62 at the edge of central opening 63. As rotor housing 13 lowers, flanges 78 ride over roller bearings 80 which also guide the tray bracket 64 to ensure the distributor 40, and in particular distributor tubes 46, remain accurately aligned with the scarifier body and the blades on the rotor housing.

Lateral tabs 79 positioned outwardly of the tip of flanges 78 are designed to come into contact with adjustable stops 81 on carriage bracket 62 located to the side of roller bearings 80. Adjustable stops 81 stop downward rotation of the distributor tray bracket 64 while rotor housing 13 continues to rotate downwardly in order to engage blades 15 in the operating condition in the ground.

The height of adjustable stops 81 may be adjusted in order to adjust the downward rotation of distributor tray bracket 64 and thereby adjust the distance that distributor tubes 46 protrude into the grooves created by the rotor blades in the ground. Accordingly, for deep scarifying where the blades are lowered to create deep grooves, adjustable stops 81 may be adjusted to allow distributor tray bracket 64 to rotate lower and thereby allow the distributor tubes to protrude further into the grooves in the ground.

Springs (not shown) are located one at each flange 78, and anchored by flange lugs 82 to bias the distributor tray bracket 64 downwardly. The other ends of the springs are fixed to the carriage 62 in order to bias upward arms 68 of distributor tray 64 bracket to move downwardly with rotor housing.

Additionally with the second embodiment of the sand dispenser return arm 58 is not located on rotor housing 13 but is instead located on distributor tray 42 to engage by way of a guide bearing to lever arm 52 on metering cylinder 23. There is only one metering spring 56 in the second embodiment wherein one end of the metering spring is attached to lever arm 52 and the other end is attached to the body of the scarifier and more specifically to the carriage bracket which is fixed by bolts to the engine base.

In the second embodiment of sand dispenser 60 the distributor lines 44 are not welded or permanently fixed to distributor tray 42 but instead the distributor lines 44 are provided as a separable component that is aligned and engages with distributor tray 42 to allow passage of sand without spillage.

Distributor tray 42 of sand scarifier 60 additionally contains dividers creating multiple compartments each associated with an aperture for dispensing sand into a corresponding distributor tube 46.

An auger shaft 65 is driven by the rotor shaft by a pulley to rotate near and parallel to rotor blades 15 in order to spread out the material collected by the rotors during scarifying and reduce clogging of the rotor housing by dirt and other scarified material collecting therein by removing material thrown by the rotor blades.

The auger shaft 65 comprises a central straight shaft 84 and flat helical blades 85 located around central shaft 84 wherein the helical blades 85 are directed in opposite directions from a mid point of the central shaft 84 to opposite ends of the shaft. The arrangement effectively loosens and dislodges material gathered by rotor blades 15 and thereby allow the blades to more cleanly and efficiently cut grooves in the ground.

In the present specification the preferred type of sand used with the apparatus is a kiln dried sand, which flows well. Additives maybe mixed in with the sand including seeds, fertilizers and other soil amendments. Indeed, whilst the apparatus described herein is called a sand dispenser it is understood that the sand may be replaced by another particular soil amendment that could be dispensed into the cut grooves, such as fine soil or finely crushed rock.

In the described embodiment the sand dispenser is mounted to a pedestrian scarifier having a rotor assembly that is raised and lowered with respect to the scarifier in order to set the scarifier in and out of an operating condition. Accordingly, the metering cylinder is mounted through a lever arrangement to respond to movement of the rotor housing which is raised and lowered with the rotor assembly.

In other embodiments, such as the tractor mounted embodiment described in WO 2005/029940, it is the wheels that are raised and lowered in order to change the height of the blades off the ground. In this embodiment the sand dispenser 20 would need to be altered to ensure that the hopper and attached components are fixed to one of the rotor housing or wheel assembly, but that the lever arrangement is attached to the other of the rotor assembly or wheel arrangement, or vice versa. The manner in which the sand dispenser would be mounted on the tractor mounted scarifier would need to ensure that as the cutting blades are lowered towards the ground the metering cylinder will rotate to open the flow path of sand through the dispenser.

In scarifiers having other means or no means for lowering the cutting blades to the ground, the option may be taken to activate rotation of the metering cylinder by a simple manual handle. Indeed, this option may be used even in connection with the pedestrian scarifier described herein if manual operation of the sand dispenser is desired or if a simplified sand dispenser is required. Such manual operating arrangement could include a cross bar extending from the lever 52 to a lateral side of the scarifier with a hand lever attached perpendicularly thereto to enable a person to pivot the handle and impart a rotating force of the metering cylinder. Alternatively, one of the end pins 28 of the metering cylinder 26 could be altered to continue extending towards a lateral side of the scarifier where a hand lever could be attached perpendicularly at the end of the pin so that a pivoting motion of the lever directly rotates the metering cylinder.

It will be understood to persons skilled in the art of the invention that many modifications may be made without departing from the spirit and scope of the invention.

The invention claimed is:

1. A sand dispenser for a scarifier wherein the sand dispenser is mounted on the scarifier and comprises:
   a sand hopper having an outlet at a lower end of the hopper; and
   a gate located below the outlet and moveable between an open position and a closed position for controlling the flow of sand through the hopper and into a distributor, the distributor including a row of distributing lines through which sand is directed to flow and enter grooves in the ground created by blades of the scarifier, each distributing line being aligned with a groove,
   wherein the gate is a metering cylinder having a row of apertures which, when aligned with the hopper outlet, permit sand to flow therethrough, the metering cylinder being rotatable between the open and closed positions; and
   wherein movement of the gate is carried out by movement of a rotor assembly which supports the blades of the scarifier, whereby lowering of the rotor assembly to engage the blades with the ground opens the gate, and raising the rotor assembly closes the gate.

2. The sand dispenser as claimed in claim 1, wherein a lever is provided to a lateral side of the metering cylinder and is directly connected to the rotor assembly, wherein movement of the rotor assembly rotates the metering cylinder between an open position and a closed position.

3. The sand dispenser as claimed in claim 2, wherein the lever is connected to the rotor assembly by way of a biasing means which biases the metering cylinder in an open position, and a return arm which moves the cylinder to a closed position.

4. The sand dispenser as claimed in claim 1, wherein a lever is provided to a lateral side of the metering cylinder and is indirectly connected to the rotor assembly to rotate the metering cylinder between an open position and a closed position.

5. The sand dispenser claimed in claim 4, wherein the lever is connected to the scarifier by a biasing means which biases the metering cylinder in an open position, and a return arm on the distributor forces against the lever to move the metering cylinder into a closed position, wherein the distributor is connected to an intermediate bracket which rotates with the rotor assembly.

6. The sand dispenser claimed in claim 5, wherein the intermediate bracket is guided to rotate with rotation on the rotor assembly between a raised position and a lowered position wherein both the rotor assembly and intermediate bracket rotate on the same shaft.

7. The sand dispenser claimed in claim 6, wherein stops provided on the scarifier stop rotation of the intermediate bracket while the rotor assembly continues to rotate, the stops being adjustable in order to adjust the lowest stop position of the intermediate bracket, to thereby adjust the location of the distributing lines relative to the grooves.

8. The sand dispenser claimed in claim 1, wherein the distributor includes a compartmentalised tray in which each compartment of the tray corresponds with a distributing line.

9. The sand dispenser as claimed in claim 1, wherein a seal is provided between the hopper outlet and the metering cylinder.

10. The sand dispenser as claimed in claim 9, wherein the seal has a row of holes that are aligned with the apertures in the metering cylinder.

11. The sand dispenser for a scarifier wherein the sand dispenser is mounted on the scarifier and comprises:
- a sand hopper having an outlet at a lower end of the hopper; and
- a gate located below the outlet and moveable between an open position and a closed position for controlling the flow of sand through the hopper and into a distributor, the distributor including a row of distributing lines through which sand is directed to flow and enter grooves in the ground created by blades of the scarifier, each distributing line being aligned with a groove,
- wherein the gate is a metering cylinder having a row of apertures which, when aligned with the hopper outlet, permit sand to flow therethrough, the metering cylinder being rotatable between the open and closed positions; and
- wherein the distributing lines include a distributing tube and a guide located at the end of the tube wherein, in use, the guide protrudes into the groove, the tube tapers from a circular cross-section at an upper part of the tube to an elliptical cross-section at the end of the tube, and the end of the tube is cut at an angle to the longitudinal direction of the tube in order to facilitate free flow of sand into the groove.

12. The sand dispenser claimed in claim 11, wherein the guide has a forward face that is shaped to sweep through a groove and clear the groove of debris or organic matter.

13. The sand dispenser claimed in claim 12, wherein the forward face tapers into a fin at its lowest point.

14. The sand dispenser claimed in claim 11, wherein the tubes and guides are made of steel.

15. A scarifier containing a main frame supported on wheels, a rotor assembly supporting blades wherein the rotor assembly is moveable between a raised position and a lowered position, driving means to drive rotation of the blades, and a sand dispenser comprising:
- a sand hopper having an outlet at a lower end of the hopper; and
- a gate located below the outlet and moveable between an open position and a closed position for controlling the flow of sand through the hopper and into a distributor, the distributor including a row of distributing lines through which sand is directed to flow and enter grooves in the ground created by blades of the scarifier, each distributing line being aligned with a groove,
- wherein the gate is a metering cylinder having a row of apertures which, when aligned with the hopper outlet, permit sand to flow therethrough, the metering cylinder being rotatable between the open and closed positions.

16. The scarifier as claimed in claim 15, wherein an auger shaft is provided to rotate near and parallel to the blades to remove material thrown by the blades, the auger shaft comprising a central shaft and flat helical blades around the central shaft, the helical blades being directed in opposite directions from a mid-point of the central shaft to opposite ends of the shaft.

17. The scarifier as claimed in claim 15, wherein a lever at an upper end of the scarifier is used to manually raise and lower the rotor housing.

18. A method of dispensing sand from a sand dispenser mounted on a scarifier including:
- introducing sand into a sand hopper of the sand dispenser;
- lowering a rotor assembly, which supports blades of the scarifier, so that the blades engage with the ground;
- rotating open a metering cylinder located below the hopper, the metering cylinder having a row of apertures that align with a hopper outlet to allow sand to flow through the hopper outlet, through the metering cylinder and into a distributor;
- synchronizing the opening of the metering cylinder with movement of lowering the rotor assembly; and
- directing sand through a row of distributing lines of the distributor and into grooves in the ground created by the blades of the scarifier, whereby each distributing line is aligned with a groove.

19. The method as claimed in claim 18, including clearing the grooves formed by the blades of debris or organic matter with the end of the distributing lines.

* * * * *